United States Patent [19]

Haugwitz et al.

[11] 3,880,871

[45] Apr. 29, 1975

[54] ISOTHIOCYANOPHENYL SUBSTITUTED IMIDAZOLES

[75] Inventors: Rudiger D. Haugwitz, Titusville; Venkatachala L. Narayanan, Hightstown, both of N.J.

[73] Assignee: E. R. Squibb & Sons, Inc., Princeton, N.J.

[22] Filed: Sept. 27, 1973

[21] Appl. No.: 401,305

[52] U.S. Cl. ...... 260/306.7 T; 260/243 R; 260/309; 424/246; 424/270; 424/273
[51] Int. Cl. ............................. C07d 93/06
[58] Field of Search .......... 260/309, 243 R, 306.7 T

[56] References Cited

UNITED STATES PATENTS 3,732,215   5/1973   Haugwitz et al. ............... 260/243 R

*Primary Examiner*—Henry R. Jiles
*Assistant Examiner*—C. M. S. Jaisle
*Attorney, Agent, or Firm*—Lawrence S. Levinson; Merle J. Smith; Donald J. Barrack

[57] ABSTRACT

Novel isothiocyanophenyl substituted imidazoles are useful as antifungal agents.

14 Claims, No Drawings

ISOTHIOCYANOPHENYL SUBSTITUTED IMIDAZOLES

BRIEF DESCRIPTION OF THE INVENTION

Compounds having the structure

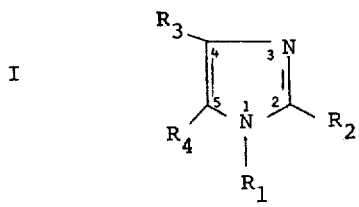

I and their physiologically acceptable acid-addition salts are useful as anti-fungal agents. In formula I, and throughout the specification, the symbols are as defined below:

$R_1$ can be hydrogen, alkyl, benzyl,

thiazolinyl, thiazinyl, or

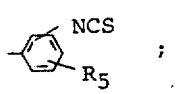

$R_2$ can be hydrogen, alkyl, phenyl, substituted phenyl, or

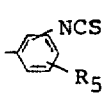

$R_3$ and $R_4$ can be the same or different and can be hydrogen, alkyl, halo, phenyl, substituted phenyl or

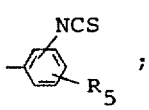

$R_5$ can be hydrogen or alkyl;
$R_6$ can be alkyl or phenyl.
At least one of $R_1$, $R_2$, $R_3$ or $R_4$ must be

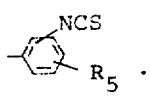

The isothiocyano group can be ortho, meta, or para to the imidazole ring. It is preferred that the isothiocyano group be para to the imidazole ring.

The term "alkyl" as used in the specification refers to alkyl groups, both straight and branched chain, having up to seven carbon atoms, e.g., methyl, ethyl, isopropyl, tert-butyl, pentyl, isohexyl, heptyl, and the like. Alkyl groups having 1 to 3 carbon atoms are preferred.

The term "alkoxy" as used in the specification refers to groups of the formula Z—O— wherein Z is alkyl as defined above.

The term "halo" as used in the specification refers to fluorine, chlorine, bromine, and iodine.

The term "substituted phenyl" as used in the specification refers to phenyl substituted with alkyl, alkoxy, halo, carboxy, or trifluoromethyl groups.

DETAILED DESCRIPTION OF THE INVENTION

The compounds of formula I can be prepared from aminophenyl substituted imidazoles having the structure

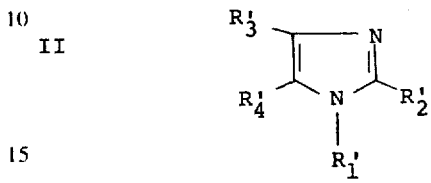

II

The symbols are as defined below:

$R'_1$ can be hydrogen, alkyl, benzyl,

thiazolinyl, thiazinyl, or

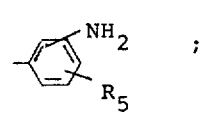

$R'_2$ can be hydrogen, alkyl, phenyl, substituted phenyl or

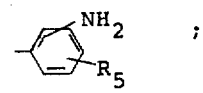

$R'_3$ and $R'_4$ can be the same or different and can be hydrogen, alkyl, halo, phenyl, substituted phenyl or

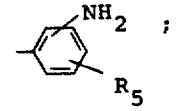

At least one of $R'_1$, $R'_2$, $R'_3$ or $R'_4$ must be

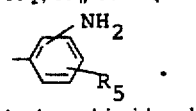

The aminophenyl substituted imidazole is reacted with a reagent capable of converting the amino group into a thiocarbonyl group. The reaction is carried out in the presence of a solvent or diluent, e.g., aromatic solvents such as benzene or toluene, a halogenated hydrocarbon such as chloroform, or an ether.

Thus, for example, an aminophenyl substituted imidazole of formula II can be converted to an isothiocyanophenyl substituted imidazole of formula I by reacting it with a thiocarbonic acid derivative having the formula

III    X—CS—Y wherein X is chlorine or bromine and Y is chlorine, bromine or a dialkylamino group such as diethylamino. Thiophosgene and N,N-diethylthiocarbamoyl chloride are exemplary of the compounds of formula III.

When thiophosgene is employed in the above reaction, the reaction is carried out at a temperature in the range of from about 0°C to about 60°C, preferably in the presence of an acid binding agent such as calcium or sodium carbonate or an amine such as triethylamine. The reaction with thiophosgene is further described in Houben-Weyl's *Methoden Der Organischen Chemie*, 4th Edition, Vol. 9, pages 867 and ff (1955). The use of the acid binding agents is further described by O. E. Schultz in Arch. Pharm. 295, 146–151 (1962).

When N,N-diethylthiocarbamoyl chloride is employed to react with a compound of formula II, the reaction is carried out at a temperature ranging from about 40°C to about 200°C as described in the procedure set forth in J. Org. Chem. 30, 2465 (1965).

Isothiocyanophenyl substituted imidazoles of formula I can also be prepared by reacting an aminophenyl substituted imidazole of formula II with carbon disulfide in the presence of an organic or inorganic base, whereby the amino group is first converted into the corresponding dithiocarbamic salt which is subsequently dehydrosulfurized to the isothiocyano group. The dehydrosulfurization can be performed oxidatively with metal salts (for a further description see British Patent No. 793,802 and Dutch Patent No. 81,326), e.g., lead, copper, zinc, or ferric salts; with iodine; with alkali metal (preferably sodium or potassium) hypochlorites or chlorites (for a further description see French Patent No. 1,311,855); with suitable acid halides such as phosgene or phosphorous oxychloride (for a further description see Chem. Ber. 98, 2425–2426 (1965)); with Cl$_2$ and ammonium sulfide (for a further description see Deutsche Auslegungsschrift 1,192,189); or with chloramine T (for a further description see British Patent No. 1,024,913).

Another method for preparing an isothiocyanophenyl substituted imidazole of formula I comprises reacting an aminophenyl substituted imidazole of formula II with phosgene and phosphorous pentasulfide according to the procedure set forth in Houben-Weyl, *Methoden Der Organischen Chemie*, 4th Edition, Vol. 9, pages 867 and ff (1955).

Still another method for preparing the isothiocyanophenyl substituted imidazoles of formula I comprises reacting an aminophenyl substituted imidazole of formula II with ammonium rhodanide and benzoyl chloride to yield the thiourea derivative which may then be thermally decomposed, e.g., in boiling chlorobenzene, to the isothiocyano derivative. A further description of the reaction may be found in Houben-Weyl, *methoden Der Organischen Chemie*, 4th Edition, Vol. 9, pages 867 and ff (1955).

Still another method for preparing the isothiocyanophenyl substituted imidazoles of formula I comprises reacting an aminophenyl substituted imidazole with carbon disulfide and dicyclohexylcarbodiimide in the presence of a tertiary amine according to the procedure set forth by J. C. Jochims, Chem. Ber. 101, 1746 (1968).

The aminophenyl substituted imidazoles of formula II can be prepared from the corresponding nitro compound having the structure IV
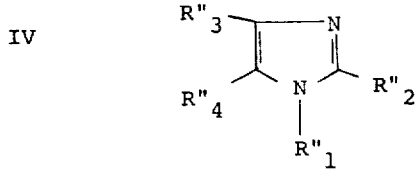

wherein the symbols are as defined below:
R''$_1$ can be hydrogen, alkyl, benzyl,

thiazolinyl, thiazinyl, or

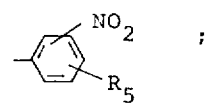

R''$_2$ can be hydrogen, alkyl, phenyl, substituted phenyl or

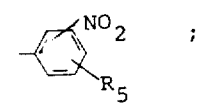

R''$_3$ and R''$_4$ can be the same or different and can be hydrogen, alkyl, halo, phenyl, substituted phenyl or

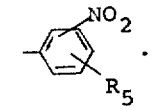

At least one of R''$_1$, R''$_2$, R''$_3$ or R''$_4$ must be

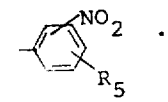

Reduction of a nitrophenyl substituted imidazole of formula IV to the corresponding aminophenyl substituted imidazole of formula II is accomplished using procedures well known in the art. Exemplary of such procedures is the use of catalytic hydrogenation using, for example, platinum oxide or palladium as the catalyst.

Nitrophenyl substituted imidazoles of formula IV are obtained by nitration of a phenyl substituted imidazole having the structure V
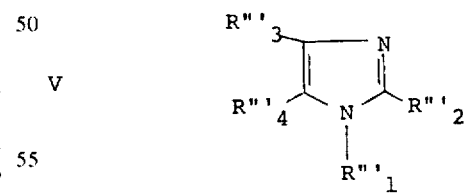

wherein the symbols are as defined below:
R'''$_1$ can be hydrogen, alkyl, benzyl,

thiazolinyl, thiazinyl, or

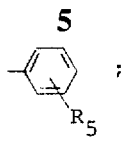

R'''₂ can be hydrogen, alkyl, phenyl, substituted phenyl or

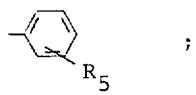

R'''₃ and R'''₄ can be the same or different and can be hydrogen, alkyl, halo, phenyl, substituted phenyl or

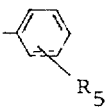

At least one of R'''₁, R'''₂, R'''₃ or R'''₄ must be 125/6

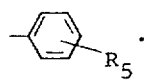

Phenyl substituted imidazoles of formula V are known, as are methods for the nitration of these compounds; see, for example, Weissberger's *The Chemistry of Heterocyclic Compounds, Imidazole and Its Derivatives*, Interscience Publisher's Co., New York, 1953, Grant et al., J. Chem. Soc. 119, 1893 (1921) and Pyman et al., J. Chem. Soc. 125, 2484 (1924). Exemplary of such methods is the reaction of a phenylimidazole of formula V with nitric acid at a temperature of from about 0°C to 100°C to yield the nitrate derivative. The nitrate is added to sulfuric acid and then heated at a temperature of about 100°C, followed by neutralization to yield a nitrophenyl substituted imidazole of formula IV.

The compounds of formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Any other salt may then be formed from the free base and the appropriate acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate, and the like.

When R₁ is hydrogen, the compounds of formula I may exist as tautomeric mixtures. The tautomers are obtained in proportions that differ from compound to compound.

The compounds of this invention are antifungal agents and are active against species of Trichophyton, e.g., *Tricophyton mentagrophytes* and Candida, e.g., *Candida albicans*. They may be administered either systemically or topically to treat fungus infections in mammals, e.g., cats, dogs, horses, cows, etc. The oral daily dosage may range from about 0.5 mg/kg to 50 mg/kg, preferably from 1 mg/kg to 25 mg/kg. Alternatively, the compounds of formula I may be administered topically in a conventional cream or lotion in which they are present in an amount of from 0.01 weight percent to 3 weight percent, preferably 0.05 weight percent to 0.2 weight percent.

Exemplary of compounds contemplated as part of this invention are compounds having the formula

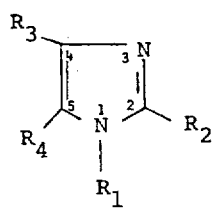

wherein the variables are as defined below:

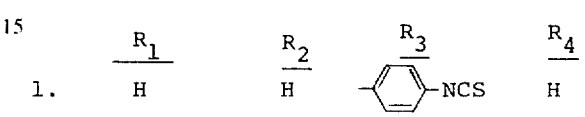
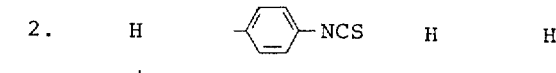
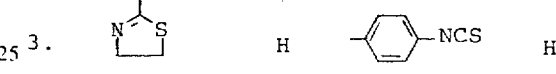
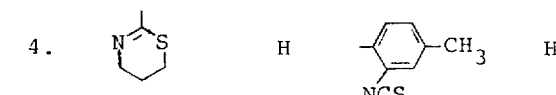
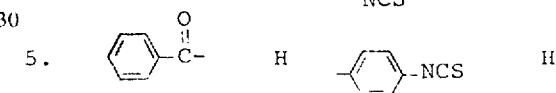
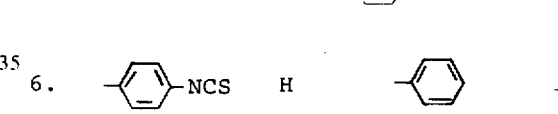
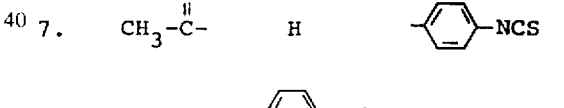
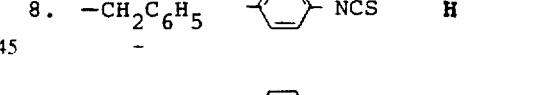
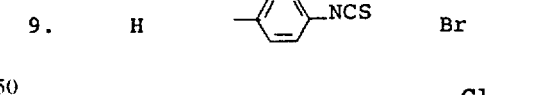
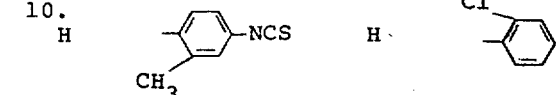
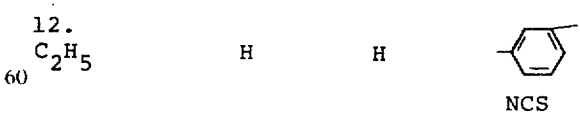

—Continued

| | $R_1$ | $R_2$ | $R_3$ | $R_4$ |
|---|---|---|---|---|
| 15. | H | 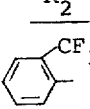 | H |  |
| 16. |  | H | $CH_3$ | H |
| 17. |  | H | H |  |
| 18. |  | H |  | H |
| 19. | H |  | H | $C_2H_5$ |

Compounds wherein $R_1$ is hydrogen, thiazolinyl, or thiazinyl are preferred.

Also preferred are those compounds wherein $R_2$ is hydrogen or

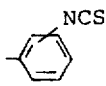

and $R_3$ and $R_4$ are each independently selected from hydrogen, halogen, and

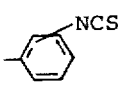

It is generally preferred that $R_5$ be hydrogen.

The following examples are specific embodiments of this invention.

EXAMPLE 1

2-(4-Isothiocyanophenyl)imidazole 10 g (0.075 mole) of 2-phenylimidazole is boiled in 100 ml of 10% nitric acid for 10 minutes. The solution is cooled and the resulting crystals filtered off and dried to yield 12.0 g of the nitrate. The salt is added to 24 ml of concentrated sulfuric acid below 30°C. The mixture is then heated on the steam bath for 4 hours poured into 240 ml of water and neutralized. The yellow precipitate is filtered off, dried, and crystallized from methanol to yield 4.9 g of 2-(4-nitrophenyl)imidazole, melting point 301°–304°C.

A mixture of 3.6 g (0.02 mole) of 2-(4-nitrophenyl)imidazole, 0.4 g of $PtO_2$ and 200 ml absolute ethanol is reduced on the Parr hydrogenator at 50 psi until the theoretical amount of hydrogen is absorbed. The mixture is filtered and the ethanol removed in vacuo. The residue is taken up in 100 ml glyme and 20 ml water, and 2.0 g of calcium carbonate is added. Then, at 0°C, there is added 1.6 ml of thiophosgene and the mixture is stirred for 2 hours. The glyme is removed in vacuo at room temperature. The solid is filtered off, dried and crystallized from chloroform to yield 1.3 g 2-(4-isothiocyanophenyl)imidazole, melting point 246°–248°C.

Anal. Calcd for $C_{10}H_7N_3S$: C, 59.69; H, 3.50; N, 20.88. Found: C, 59.44; H, 3.41; N, 20.76.

EXAMPLE 2

4-(4-Isothiocyanophenyl)imidazole

A mixture of 3.0 g of 4-(4-nitrophenyl)imidazole, and 0.3 g of $PtO_2$ in 200 ml of absolute ethanol is reduced on the Parr hydrogenator at 50 psi until the theoretical amount of hydrogen is absorbed. The solution is filtered and the solvent is removed in vacuo to yield a yellow viscous oil which is dissolved in 120 ml of glyme and 40 ml of water and cooled to 0°C. First, 1.6 g of calcium carbonate and then 1.3 ml of thiophosgene is added, and the mixture is stirred for 1.5 hours while allowing it to warm to room temperature. The glyme is removed in vacuo and the resulting solid is filtered off, dried, and crystallized from chloroform to yield 1.2 g 4-(4-isothiocyanophenyl)imidazole, melting point 202°–204°C.

Anal. Calcd for $C_{10}H_7N_3S$: C, 59.69; H, 3.50; N, 20.88. Found: C, 59.58; H, 3.75; N, 20.60.

EXAMPLE 3

4-(4-Isothiocyanophenyl)-1-(2-thiazolin-2-yl)imidazole

To a solution of 3.0 g of 4-(4-nitrophenyl)imidazole in 250 ml of dry glyme there is added 0.7 g of sodium hydride (50% oil dispersion) and the mixture is stirred at room temperature for 2 hours. A solution of 1.8 g of 2-chloroethyl isothiocyanate in 5 ml of dry glyme is then added and the mixture is refluxed for two hours. The glyme is removed in vacuo and water is added. The resulting solid is filtered off and crystallized twice from chloroform to yield 2.7 g 4-(4-nitrophenyl)-1-(2-thiazolin-2-yl)imidazole, melting point 247°–249°C.

A mixture of 4.0 g of 4-(4-nitrophenyl)-1-(2-thiazolin-2-yl)imidazole, and 0.4 g of $PtO_2$ in 250 ml of absolute ethanol is reduced on the Parr hydrogenator at 50 psi until the theoretical amount of hydrogen is absorbed. The solution is filtered and the solvent is resorbed. The residue is taken up in 100 ml glyme and 20 ml water, and 2.0 g calcium carbonate is added. Then at 0°C, there is added 1.8 ml of thiophosgene and the mixture is stirred for 2 hours. The glyme is removed in vacuo at room temperature. The solid is filtered off, dried, and crystallized from ether to yield 4-(4-isothiocyanophenyl)-1-(2-thiazolin-2-yl)imidazole.

EXAMPLE 4

2,4,5-Tri(4-isothiocyanophenyl)imidazole 10 g of lophine (2,4,5-triphenylimidazole) is added to 50 ml of fuming nitric acid at 0°C and the mixture is allowed to stir overnight at room temperature. The mixture is poured into water and the resulting solid is filtered off, washed with water, dried, and crystallized from dilute pyridine to yield 12.0 g of 2,4,5-tri(4-nitrophenyl)imidazole, m.p. 321°–323°.

Following the procedure of Example 1, but substituting 2,4,5-tri(4-nitrophenyl)imidazole for 2-(4-nitrophenyl)imidazole, 2,4,5-tri(4-isothiocyanophenyl)imidazole is obtained.

EXAMPLE 5

4,5-Dibromo-2-(4-isothiocyanophenyl)imidazole 3.3 g of potassium nitrate is added to a solution of 10 g of 4,5-dibromo-2-phenylimidazole in 40 ml conc. sulfuric acid at 0°C. The mixture is heated on a steam bath for two hours and then poured into water. The resulting precipitate is filtered off, washed with water, dried and crystallized from ethanol to yield 5.3 g of 4,5-dibromo-2-(4-nitrophenyl)imidazole, melting point 205°–209°C.

Following the procedure of Example I but substituting 4,5-dibromo-2-(4-nitrophenyl)imidazole for 2-(4-nitrophenyl)imidazole, 4,5-dibromo-2-(4-isothiocyanophenyl)imidazole is obtained.

What is claimed is:

1. A compound having the structure

wherein $R_1$ is selected from the group consisting of hydrogen, alkyl, benzyl,

2-thiazolin-2-yl, 2-thiazine-2-yl and

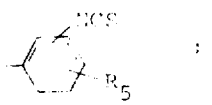

$R_2$ is selected from the group consisting of hydrogen, alkyl, phenyl, substituted phenyl and

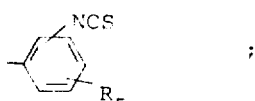

$R_3$ and $R_4$ are the same or different and are each selected from the group consisting of hydrogen, alkyl, halo, phenyl, substituted phenyl and

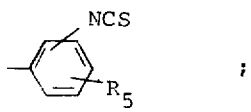

$R_5$ is selected from the group consisting of hydrogen and alkyl;

$R_6$ is selected from the group consisting of alkyl and phenyl;

wherein the term alkyl refers to alkyl groups having up to seven carbon atoms; wherein the term alkoxy refers to alkoxy groups having up to seven carbon atoms; wherein at least one of $R_1$, $R_2$, $R_3$ and $R_4$ is

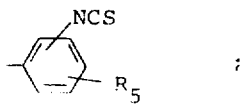

and wherein the expression substituted phenyl refers to phenyl substituted with alkyl, alkoxy, halo, carboxy or trifluoromethyl groups; and a physiologically acceptable acid-addition salt thereof.

2. A compound in accordance with claim 1 wherein $R_1$ is

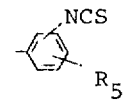

3. A compound in accordance with claim 1 wherein $R_2$ is

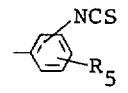

4. A compound in accordance with claim 1 wherein $R_3$ is

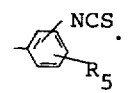

5. A compound in accordance with claim 1 wherein $R_1$ is

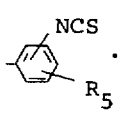

6. A compound in accordance with claim 2 wherein $R_2$, $R_3$, and $R_4$ are hydrogen.

7. A compound in accordance with claim 3 wherein $R_1$, $R_3$, and $R_4$ are hydrogen.

8. A compound in accordance with claim 4 wherein $R_1$, $R_2$, and $R_4$ are hydrogen.

9. A compound in accordance with claim 5 wherein $R_1$, $R_2$, and $R_3$ are hydrogen.

10. The compound in accordance with claim 1 having the name 2-(4-isothiocyanophenyl)imidazole.

11. The compound in accordance with claim 1 having the name 4-(4-isothiocyanophenyl)imidazole.

12. The compound in accordance with claim 1 having the name 4-(4-isothiocyanophenyl)-1-(2-thiazolin-2-yl)imidazole.

13. The compound in accordance with claim 1 having the name 2,4,5-tri(4-isothiocyanophenyl)imidazole.

14. The compound in accordance with claim 1 having the name 4,5-dibromo-2-(4-isothiocyanophenyl)imidazole.

* * * * *